(12) United States Patent
Torrione

(10) Patent No.: US 10,982,950 B2
(45) Date of Patent: Apr. 20, 2021

(54) OIL RIG DRILL PIPE AND TUBING TALLY SYSTEM

(71) Applicant: HELMERICH & PAYNE TECHNOLOGIES, LLC, Tulsa, OK (US)

(72) Inventor: Peter A. Torrione, Durham, NC (US)

(73) Assignee: Helmerich & Payne Technologies, LLC, Tulsa, OK (US)

( * ) Notice: Subject to any disclaimer, the term of this patent is extended or adjusted under 35 U.S.C. 154(b) by 0 days.

(21) Appl. No.: 16/502,689

(22) Filed: Jul. 3, 2019

(65) Prior Publication Data
US 2019/0385298 A1 Dec. 19, 2019

Related U.S. Application Data

(63) Continuation of application No. 14/939,089, filed on Nov. 12, 2015.
(Continued)

(51) Int. Cl.
*G01B 11/08* (2006.01)
*G06T 7/00* (2017.01)
(Continued)

(52) U.S. Cl.
CPC ............ *G01B 11/08* (2013.01); *E21B 17/006* (2013.01); *E21B 19/06* (2013.01); *E21B 19/20* (2013.01);
(Continued)

(58) Field of Classification Search
CPC ......... G06T 7/0004; G06T 2207/30108; E21B 41/0092; E21B 19/20; E21B 17/006;
(Continued)

(56) References Cited

U.S. PATENT DOCUMENTS 4,610,005 A 9/1986 Utasi
6,469,734 B1 10/2002 Nichani et al.
(Continued)

FOREIGN PATENT DOCUMENTS

WO 2016147045 A1 9/2016
WO 2017042677 A1 3/2017
(Continued)

OTHER PUBLICATIONS

PCT Search Report (PCT/US2015/060318), dated Jan. 28, 2016.
PCT Search Report & Written Opinion (PCT/US2015/060318), dated Jan. 28, 2016.

*Primary Examiner* — Farzana Hossain
(74) *Attorney, Agent, or Firm* — Kilpatrick Townsend & Stockton LLP

(57) ABSTRACT

Disclosed embodiments relate to systems and methods for locating, measuring, counting or aiding in the handling of drill pipes 106. The system 100 comprises at least one camera 102 capable of gathering visual data 150 regarding detecting, localizing or both, pipes 106, roughnecks 116, elevators 118 and combinations thereof. The system 100 further comprises a processor 110 and a logging system 114 for recording the gathered visual data 150. The method 200 comprises acquiring visual data 150 using a camera 106, analyzing the acquired data 150, and recording the acquired data 150.

25 Claims, 3 Drawing Sheets

Related U.S. Application Data

(60) Provisional application No. 62/078,577, filed on Nov. 12, 2014.

(51) Int. Cl.
| | |
|---|---|
| *G01B 11/02* | (2006.01) |
| *E21B 47/04* | (2012.01) |
| *E21B 41/00* | (2006.01) |
| *E21B 44/00* | (2006.01) |
| *E21B 19/20* | (2006.01) |
| *E21B 17/00* | (2006.01) |
| *E21B 19/06* | (2006.01) |
| *G08B 21/18* | (2006.01) |

(52) U.S. Cl.
CPC .......... *E21B 41/00* (2013.01); *E21B 41/0092* (2013.01); *E21B 44/00* (2013.01); *E21B 47/04* (2013.01); *G01B 11/02* (2013.01); *G01B 11/022* (2013.01); *G06T 7/0004* (2013.01); *G08B 21/182* (2013.01); *G08B 21/187* (2013.01); *G06T 2207/30108* (2013.01)

(58) Field of Classification Search
CPC ..... E21B 19/06; G08B 21/187; G08B 21/182; G01B 11/022; G01B 11/08
See application file for complete search history.

(56) References Cited

U.S. PATENT DOCUMENTS

| | | |
|---|---|---|
| 7,874,351 B2 | 1/2011 | Hampton et al. |
| 7,933,166 B2 | 4/2011 | Goodman |
| 8,218,826 B2 | 7/2012 | Ciglenec et al. |
| 8,233,667 B2 | 7/2012 | Helgason et al. |
| 8,363,101 B2 | 1/2013 | Gschwendtner et al. |
| 8,395,661 B1 | 3/2013 | Olsson et al. |
| 8,547,428 B1 | 10/2013 | Olsson et al. |
| 8,622,128 B2 | 1/2014 | Hegeman |
| 8,812,236 B1 | 8/2014 | Freeman et al. |
| 8,873,806 B2 | 10/2014 | Kiest |
| 9,041,794 B1 | 5/2015 | Olsson et al. |
| 9,134,255 B1 | 9/2015 | Olsson et al. |
| 9,279,319 B2 | 3/2016 | Savage |
| 9,410,877 B2 | 8/2016 | Maxey et al. |
| 9,464,492 B2 | 10/2016 | Austefjord et al. |
| 9,518,817 B2 | 12/2016 | Baba et al. |
| 9,651,468 B2 | 5/2017 | Rowe et al. |
| 9,664,011 B2 | 5/2017 | Kruspe et al. |
| 9,677,882 B2 | 6/2017 | Kiest |
| 9,706,185 B2 | 7/2017 | Ellis |
| 9,869,145 B2 | 1/2018 | Jones et al. |
| 9,912,918 B2 | 3/2018 | Samuel |
| 9,915,112 B2 | 3/2018 | Geehan et al. |
| 10,227,859 B2 | 3/2019 | Richards et al. |
| 10,328,503 B2 | 6/2019 | Osawa et al. |
| 2009/0159294 A1* | 6/2009 | Abdollahi ............... E21B 19/14 166/377 |
| 2010/0328095 A1 | 12/2010 | Hawthorn et al. |
| 2011/0280104 A1* | 11/2011 | McClung, III ............ E21B 3/02 367/82 |
| 2011/0308332 A1 | 12/2011 | Blessum et al. |
| 2012/0123756 A1* | 5/2012 | Wang ..................... E21B 44/00 703/2 |
| 2012/0163932 A1* | 6/2012 | Schmidt .................. B25F 5/021 408/1 R |
| 2012/0188090 A1 | 7/2012 | Wessling et al. |
| 2013/0265409 A1 | 9/2013 | Li et al. |
| 2013/0236064 A1 | 10/2013 | Tjhang et al. |
| 2013/0275100 A1 | 10/2013 | Ellis et al. |
| 2013/0345878 A1* | 12/2013 | Austefjord ............. B66C 13/02 700/275 |
| 2014/0002617 A1 | 1/2014 | Zhang et al. |
| 2014/0326505 A1 | 11/2014 | Davis et al. |
| 2014/0333754 A1 | 11/2014 | Graves et al. |
| 2015/0114634 A1* | 4/2015 | Limbacher ............... E21B 47/04 166/255.1 |
| 2015/0138337 A1 | 5/2015 | Tjhang et al. |
| 2015/0218936 A1 | 8/2015 | Maher et al. |
| 2015/0345261 A1* | 12/2015 | Kruspe ................... E21B 47/12 175/40 |
| 2016/0130889 A1 | 5/2016 | Torrione |
| 2017/0089153 A1 | 3/2017 | Teodorescu |
| 2017/0138171 A1 | 5/2017 | Richards et al. |
| 2017/0145807 A1 | 5/2017 | Wendorf et al. |
| 2017/0152729 A1* | 6/2017 | Gleitman ................ E21B 41/00 |
| 2017/0161885 A1 | 6/2017 | Parmeshwar et al. |
| 2017/0167853 A1 | 6/2017 | Zheng et al. |
| 2017/0284184 A1* | 10/2017 | Anghelescu ............ G06F 3/002 |
| 2017/0322086 A1 | 11/2017 | Luharuka et al. |
| 2018/0180524 A1 | 6/2018 | Francois et al. |
| 2019/0100988 A1 | 4/2019 | Ellis et al. |
| 2019/0102612 A1 | 4/2019 | Takemoto et al. |
| 2019/0136650 A1 | 5/2019 | Zheng et al. |
| 2019/0141294 A1 | 5/2019 | Thorn et al. |
| 2019/0206068 A1 | 7/2019 | Stark et al. |

FOREIGN PATENT DOCUMENTS

| | | |
|---|---|---|
| WO | 2017132297 A1 | 8/2017 |
| WO | 2017169225 A1 | 10/2017 |
| WO | 2017176689 A1 | 10/2017 |
| WO | 2017194078 A1 | 11/2017 |
| WO | 2017210033 A1 | 12/2017 |
| WO | 2018067122 A1 | 4/2018 |
| WO | 2018093273 A1 | 5/2018 |
| WO | 2018131485 A1 | 7/2018 |
| WO | 2018148832 A1 | 8/2018 |
| WO | 2018157513 A1 | 9/2018 |

* cited by examiner

OIL RIG DRILL PIPE AND TUBING TALLY SYSTEM

CROSS-REFERENCE

This application is a continuation of U.S. patent application Ser. No. 14/939,089, filed Nov. 12, 2015, which claims benefit of U.S. Provisional Application No. 62/078,577, filed Nov. 12, 2014, both of which are incorporated by reference.

FIELD OF THE INVENTION

Embodiments described herein relate to systems and methods for locating, measuring, counting, and aiding in the handling of drill pipes.

BACKGROUND AND SUMMARY

Modern drilling involves scores of people and multiple inter-connecting activities. Obtaining real-time information about ongoing operations is of paramount importance for safe, efficient drilling. As a result, modern rigs often have thousands of sensors actively measuring numerous parameters related to vessel operation, in addition to information about the down-hole drilling environment.

Despite the multitude of sensors on today's rigs, a significant portion of rig activities and sensing problems remain difficult to measure with classical instrumentation and person-in-the-loop sensing is often utilized in place of automated sensing.

By applying automated, computer-based video interpretation, continuous, robust, and accurate assessment of many different phenomena can be achieved through pre-existing video data without requiring a person-in-the-loop. Automated interpretation of video data is known as computer vision, and recent advances in computer vision technologies have led to significantly improved performance across a wide range of video-based sensing tasks. Computer vision can be used to improve safety, reduce costs and improve efficiency.

Handling and counting of drill pipes on a rig is typically accomplished using primarily human-in-the-loop techniques. For example, a person is responsible for maintaining an accurate log of the types, diameters and lengths of pipes entered into the well-bore as drilling progresses and responsible for counting pipes as they are removed from the well-bore. Although a relatively simple human endeavor, errors in pipe tallying can and do occur, and these errors can cause significant disruptions to drilling activities.

Classical instrumentation for pipe tallying is either time-consuming (e.g., manual measurement of each pipe) or not suitable for harsh down-well conditions (e.g., RFID tagging). In contrast, computer vision technologies can be utilized to perform many of the activities currently undertaken manually, providing significant savings in drilling time and cost and reducing the risk from pipe tally errors. These techniques provide a more accurate technique for generating pipe tallies and can significantly reduce rig down-time due to pipe tally errors; potentially saving millions of dollars per year. Therefore, there is a need for an automated computer vision based technique for measuring pipe lengths and diameters, and counting pipe segments as they enter into or are removed from the well-bore.

DETAILED DESCRIPTION

Figure 1:
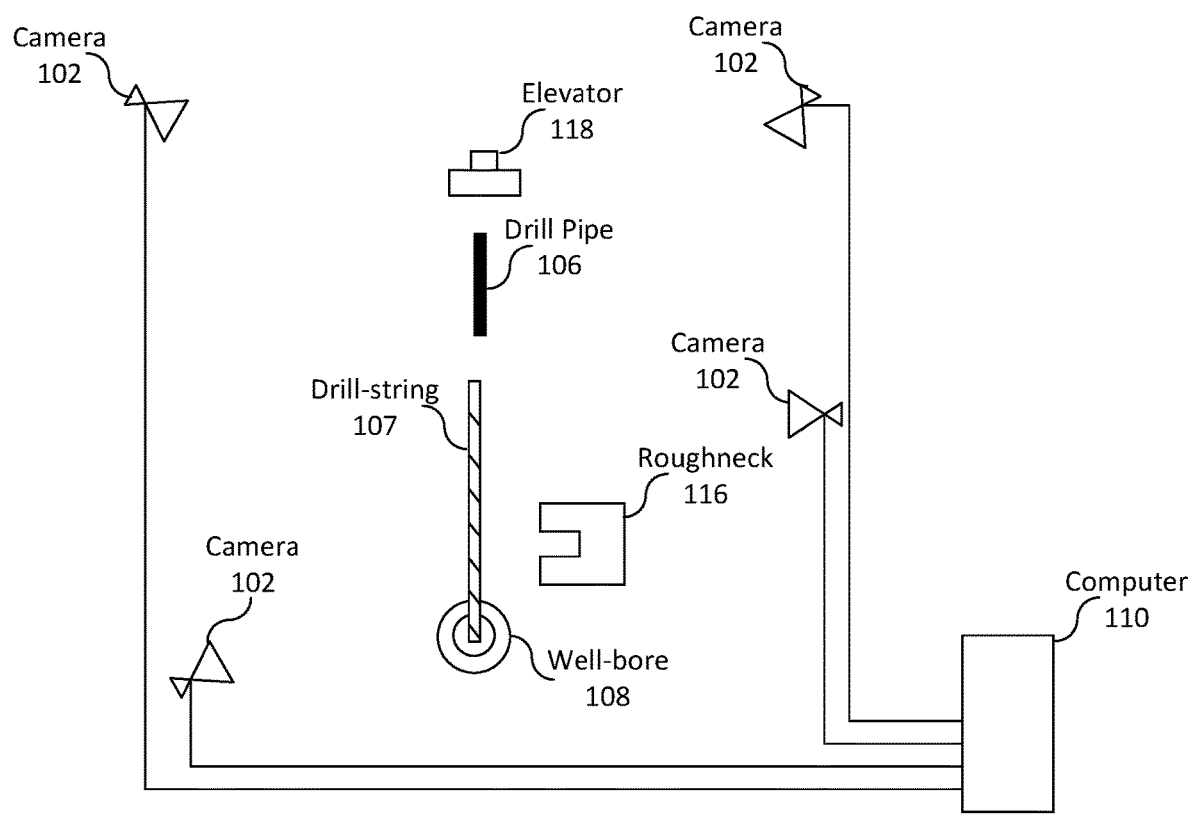
FIG. 1 depicts one of many embodiments of a system involving multiple cameras and CPUs for monitoring drilling pipe and assisting in drilling pipe handling.

The "Pipe Tally System" system, PTS, consists of several parts. In one preferred embodiment, one or more video cameras 102 positioned so as to be able to see the drilling pipe 106 as it is attached to, or removed from the drill-string 107. Depending on requirements, one camera 102 at sufficient distance from the bore-hole 108 to view the entire pipe 106 segment at once may be sufficient, otherwise two or more cameras 102 may be used, each of which may only see part of the pipe 106 as it is entered into the drill-string 107, but information or data 150 can be aggregated across the different cameras using the known camera positions and poses.

Each camera 102 may contain or be connected to a computer 110 which detects and localizes pipes 106, the iron roughneck 116, the elevator 118, or other relevant components. Different regions of interest for each object type can be defined using the known camera 102 geometry, or using user-inputs. Since the cameras 102 are at known distances from the bore-hole 108, camera transform information can be used to calculate the pipe lengths and diameters as they are tracked into and out of the well-bore 108. Information about the well-state, including the number of pipe stands and pipe segments 106 in the well may be accumulated on a central computing resource 110. In an alternative embodiment involving multiple cameras 102, pipe length, diameter, location and tracking information may be calculated by accumulating information 150 about the pipe 106 across multiple camera feeds.

Pipes 106 on a rig may be marked with paint or other marking system to make them easier to detect (e.g., a colorful stripe of paint near either end of the pipe 106 can help in detection, localization and length estimation).

In certain embodiments, the resulting information 150 about pipes 106 may be amalgamated into an automatically generated well-state report which may include a pipe tally (information about the pipe lengths and diameters, time the pipe 106 was added to or removed from the drill-string 107, or any other pipe 106 specific information). Automatic alarms 120 may be raised to the attention of the drill team (1) if at any time the automatic pipe tally does not match a manually generated pipe tally, (2) if a new piece of pipe 106 being added to the drill-string 107 is not commensurate with the current drill-string 107 (e.g., wrong pipe diameter), or (3) any other condition arises in which an alarm 120 is desired.

In FIG. 1, cameras 102 are mounted around the drill-string 107, oriented to be able to see new segments of pipe 106 as they are added to the drill-string 107, or as they are removed from the drill-string 107. If the rig design allows it, one camera 102 may be sufficient. Alternatively, multiple cameras 102, each of which may only be able to see part of the pipe 106 can also be utilized. In some embodiments, cameras 102 may also be able to see well-bore 108, rough neck 116 and elevator 118. Processor 110 is connected to cameras 102 and capable of analyzing the visual data 150 gathered by the cameras 102.

Figure 2:
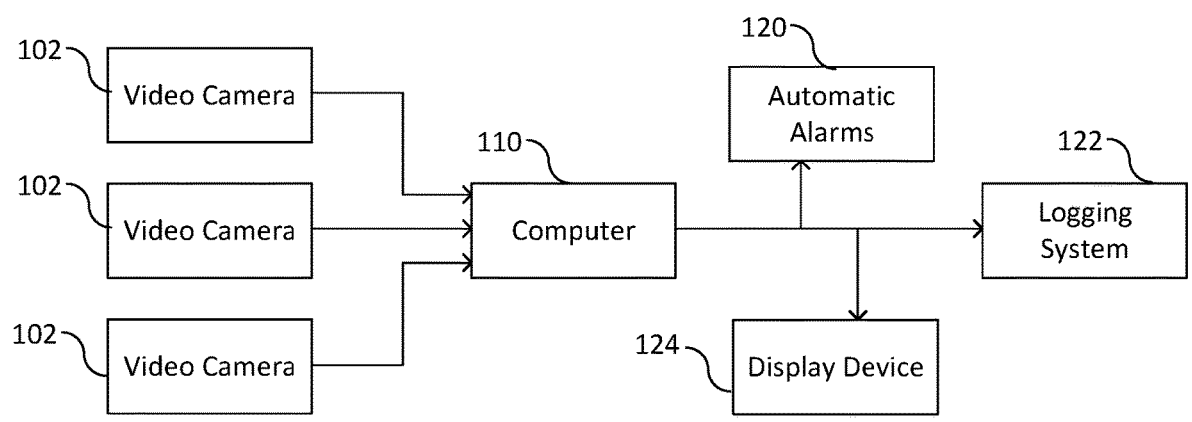
FIG. 2 depicts a potential series of steps involved in a system for monitoring drilling pipe and assisting in drilling pipe handling.

In FIG. 2, a potential configuration of the disclosed system is shown. Cameras 102 are connected to processor 110. Processor 110 may be connected to a logging system 122, an alarm 120 and/or a display device 124. It will be appreciated that many embodiments may contain greater or fewer cameras 102, processors 110 or other components than specifically shown in FIG. 2.

Figure 3:
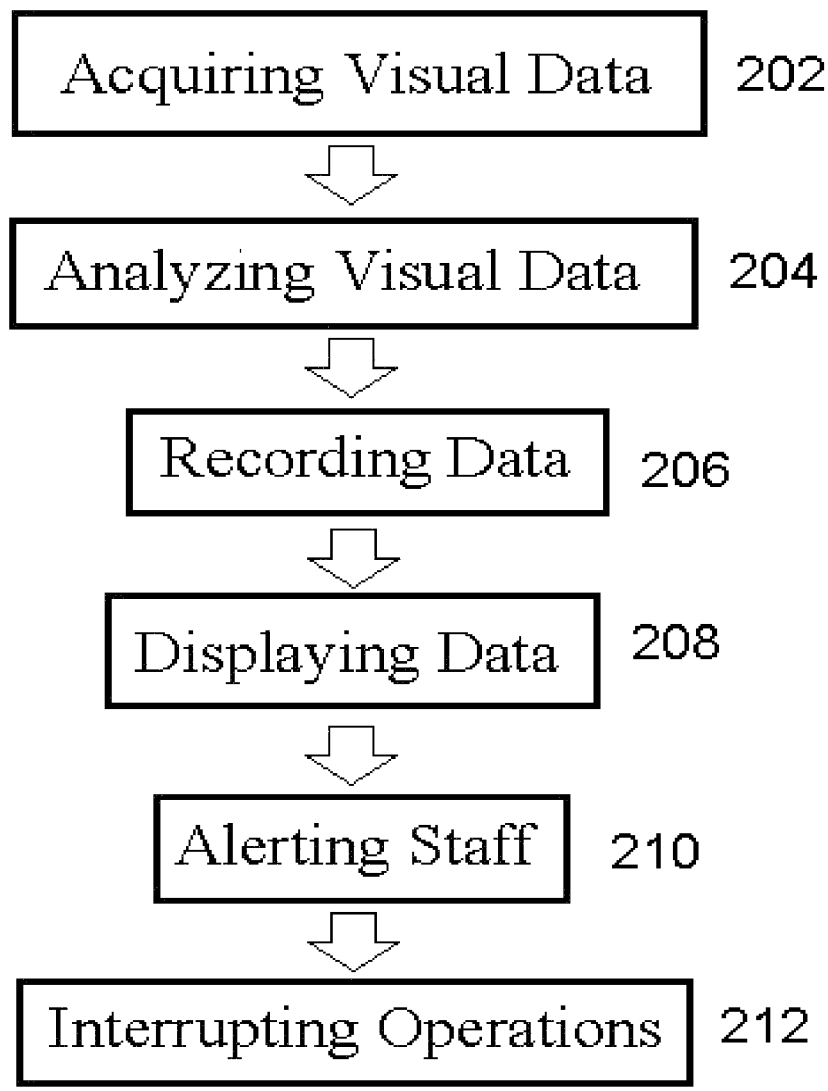
FIG. 3 depicts a potential series of steps involved in visually analyzing pipe detection.

FIG. 3 shows the steps involved in a potential method for locating, measuring, counting, and/or aiding in the handling of drill pipes. The method includes acquiring visual data 202, analyzing visual data 204, recording data 206, displaying data 208, alerting staff 210 and interrupting operations 212.

Specific regions of the scene (region of interest) may be identified during installation to specify the location of the vertical region above the well-bore 108, the location of the iron roughneck 116, or other relevant locations in each camera's 102 field of view.

During installation, the locations and poses of each camera 102 may be recorded. Camera locations can be finely estimated using standard camera calibration techniques (e.g., fiducial objects of known size and location in each camera's 102 field of view) immediately after installation, or whenever the cameras 102 have moved enough to require re-calibration.

In the case of multiple cameras 102, at least one camera 102 should be able to see the top and another camera 102 see the bottom of the pipe 106 at the same time when the pipe 106 is directly above the drill-string 107.

Pipe 106, roughneck 116 and/or elevator 118 detection may be accomplished using a combination of techniques. In an alternative embodiment, adaptive background estimation and subtraction models (e.g., adaptive Gaussian mixture models) may be applied to perform foreground and/or background segmentation. Since the background should be relatively stable over the time-frames during which each object is in-frame, adaptive background updating can be halted when a specific object is detected. This prevents the background estimation from "learning" the pipe 106 as part of the background. Furthermore, shape and size constraints can be applied to reduce false-alarms due to other non-pipe related changes in the scene. Pipes 106 used in drilling are long and narrow, and the diameters of the pipes 106 under consideration are tightly constrained. As a result, object aspect ratio and object size (given known camera 102 location relative to the drill-string 107) can be used to reduce non-pipe false alarms.

Changes in the background that are approximately the correct size and shape are then sent to a confirmation step, which takes into account features extracted from the detected regions. These features include pixel values, color histograms, and texture features, since each of these is indicative of the material composition of the object under consideration. A support vector machine trained to recognize pipe 106, roughneck 116, and/or elevator 118 like regions is then applied to the features extracted from each foreground region. The detections may be input into a finite state machine (FIG. 4).

Finite state machine logic systems may be used to ensure that the pipe tally is accurate by ensuring that the computer vision system 100 only increments the pipe tally when a suitable series of events has transpired. FIG. 4 shows a finite state machine which may be used for incrementing the pipe tally during tripping out of the hole.

In each state, state specific variables may be calculated and recorded. For example, the pipe tracker uses a combination of point-matching (using Harris features and SIFT and BRIEF descriptors) within the pipe region, as well as Lucas-Kanade optical-flow techniques to estimate the per frame velocity of the pipe 106. If the aggregate motion of the pipe 106 is "in well" (down), the pipe 106 is considered added to the drill-string 107, and this is marked in the pipe tally. If the aggregate motion of the pipe 106 is "out of well" (up), the pipe 106 is considered removed from the drill-string 107, and this is marked in the pipe tally.

Once a pipe 106 is tracked, its length and diameter may be constantly estimated and updated over time as long as the pipe 106 is in-frame. Estimation of the pipe length and diameter are possible since the aggregate change detection and pipe detection steps described above result in a bounding-box in image space containing the projection of the pipe 106 into the frame. Given the pixels comprising the pipe 106, and the camera 102 location and pose information, it is possible to measure the pipe diameter and length. These measurements are refined over time to reduce uncertainty and noise due to inter-pixel variance.

When the pipe 106 exits the scene (whether into or out of the well), the average measured pipe length and diameter may be provided to the pipe tally. For pipes 106 exiting the well, if these values do not agree with the same values measured when the pipe 106 entered the well, an alarm 120 may be raised. For pipes 106 entering the well, if these values are outside the normal bounds, or are not commensurate with the previous pipe 106 to enter the well, an alarm 120 may be raised.

Embodiments disclosed herein may relate to a system for locating, measuring, counting or aiding in the handling of drill pipes 106. The system may include at least one camera 102 which is operably connected to at least one processor 110. The camera 102 may be capable of gathering visual data 150 regarding detecting and/or localizing components of a drilling rig which may include pipes 106, drill pipes, roughnecks 116, elevators 118, drill-string components and combinations thereof. The processor 110 may be configured to analyze the visual data and may also be operably connected to the pipe elevator 118. The processor may be configured to halt elevator 118 operations when the visual data is outside of a pre-determined set of conditions. The system may also include at least one logging system 124 connected to said processor 110 for recording said visual data 150 and any analyzed data.

Certain embodiments may also include a display system 122 for displaying the collected and/or analyzed data. Embodiments may include a camera 102 which also comprises the processor 110. Embodiments of the system may also include an alarm 120 for alerting staff to the occurrence of a predetermined condition.

Disclosed embodiments may also relate to a method for locating, measuring, counting or aiding in the handling of drill pipes. The method includes acquiring visual data from at least one camera 102, analyzing said visual data 150, recording said analyzed data and disrupting the operations of a pipe elevator in response to a pre-determined condition.

Certain embodiments may also include displaying the acquired, analyzed or recorded data on a display device 122. Embodiments may also include alerting staff to any occurrence of a pre-determined condition or any measurement that falls outside of a pre-determined range using an alarm 120.

Additional embodiments relate to a system for assisting in the handling of drill pipe segments. The system may include a well-bore 108 which is being worked by a drill-string 107. The drill-string 107 may comprise a plurality of drill pipe 106 segments. The system may also contain at least one camera 102 configured to observe the addition or subtraction of drill pipe 106 segments to the drill-string 107 and gathering visual data 150. The camera 102 may be operably connected to a processor 110. The process 110 may be capable of analyzing the visual data 150.

Certain embodiments may also include a logging system 124 connected to the processor 110. Embodiments may also include a display system 122 for displaying the collected and/or analyzed data. Some embodiments may include a camera 102 which includes a processor 110. Embodiments may also contain an alarm 120 for alerting staff of the occurrence of a pre-determined condition.

What is claimed is:

1. A drill pipe tally system for oil rigs comprising:
one or more drill pipe segments;
a drill pipe elevator, wherein the drill pipe elevator is operably connected to a computer vision processor and configured to receive instructions from the computer vision processor;
one or more cameras mounted to an oil rig, wherein at least one camera has a field of view that includes a region of interest, and is positioned to view a drill pipe segment entering a bore hole of a wellbore; and
a computer vision processor in data communication with the one or more cameras, the computer vision processor configured to receive visual data from the one or more cameras and configured to detect and localize a drill pipe segment based on the received visual data,
wherein the computer vision processor is configured to alter drill pipe elevator operations based on the visual data received from the one or more cameras, and
wherein the computer vision processor is configured to generate a pipe tally report, wherein the generation of the pipe tally report further comprises adding an entry into a pipe tally record when the drill pipe segment exits the region of interest in the field of view of the at least one camera in a direction of the wellbore.

2. The system of claim 1, wherein the one or more cameras are configured to simultaneously view a top and a bottom of the drill pipe segment when the drill pipe segment is positioned above a drill-string.

3. The system of claim 1, wherein the region of interest includes a vertical region above the wellbore.

4. The system of claim 1, further comprising a support vector machine, wherein the support vector machine is configured to recognize a drill pipe segment.

5. The system of claim 1, wherein the computer vision processor is configured to estimate a velocity of a drill pipe segment.

6. The system of claim 1, further comprising a finite state machine logic system configured to ensure the pipe tally report is accurate.

7. The system of claim 1, wherein the pipe tally report comprises information about at least one of a pipe length, a pipe diameter, a time a pipe is added to a drill string, or a time a pipe is removed from the drill string.

8. The system of claim 1, wherein the computer vision processor is configured to receive a second pipe tally report and issue an alarm if the generated pipe tally report does not match the received second pipe tally report.

9. The system of claim 1, wherein the computer vision processor is configured determine a diameter of a detected drill pipe segment and to issue an alarm if the diameter of the detected drill pipe segment does not match a diameter of a drill pipe segment previously added to or removed from a drill string.

10. The system of claim 1, wherein the computer vision processor is configured to utilize adaptive background estimation and background subtraction to detect and localize a pipe segment and wherein, upon detecting a pipe segment, the computer vision processor is configured to halt adaptive background updating for a predetermined period of time.

11. A method for tallying drill pipe segments on an oil rig comprising:
handling a drill pipe segment using an oil rig elevator;
positioning one or more cameras to view the drill pipe segment entering or exiting a bore hole of a wellbore;
gathering visual data regarding the drill pipe segment using the one or more cameras, wherein the one or more cameras have a field of view including a region of interest;
transmitting the visual data to a computer vision processor;
detecting, using the computer vision processor, a drill pipe segment based on the received visual data;
determining, using the computer vision processor, a location of the drill pipe segment based on the received visual data;
adding a record to a pipe tally record when the computer vision processor determines from the visual data that the drill pipe segment has exited the region of interest in the field of view of the one or more cameras in a direction of the well;
generating a pipe tally report automatically based on the received visual data; and
interrupting an operation of the oil rig elevator based on the received visual data.

12. The method of claim 11, further comprising mounting one or more cameras a known distance from a bore hole of a well bore.

13. The method of claim 11, further comprising estimating a length and a diameter of a drill pipe segment based on the gathered visual data.

14. The method of claim 11, further comprising recording a location and a pose of the one or more cameras mounted to the oil rig; and calibrating the location of the one or more cameras using a fiducial object.

15. The method of claim 11, further comprising generating a well state report comprising at least one of a number of drill pipe segments in the wellbore, a diameter of the drill pipe segment, a length of the drill pipe segment, or a time the drill pipe segment was added to a drill string.

16. The method of claim 11, further comprising manually generating a pipe tally report; comparing the manually generated pipe tally report to the automatically generated pipe tally report; and issuing an alarm if the automatically generated pipe tally report does not match the manually generated pipe tally report.

17. The method of claim 11, further comprising accumulating information about a drill pipe segment from more than one camera feed.

18. The method of claim 11, further comprising applying shape and size constraints to the visual data to reduce false alarms.

19. The method of claim 11, further comprising estimating a per frame velocity of a drill pipe segment.

20. The method of claim 11, further comprising updating the pipe tally report when a drill pipe segment exits the field of view of the one or more cameras.

21. A drill pipe tally system for an oil rig using computer vision, the system comprising:
a plurality of cameras mounted on the oil rig, wherein the oil rig is adapted to drill a wellbore and comprises a drill pipe elevator, and wherein each of the plurality of cameras has a field of view that includes a region of interest and is positioned to view a drill pipe segment entering the wellbore; and a computer vision processor communicatively coupled to the plurality of cameras and the drill pipe elevator, wherein the computer vision processor is configured to:

receive visual data from the plurality of cameras;

detect and localize a drill pipe segment based on the visual data; and generate a pipe tally report, wherein the generation of the pipe tally report comprises:

adding an entry into a pipe tally record when the drill pipe segment exits the region of interest in the field of view of the plurality of cameras in a direction of the wellbore; and removing an entry from the pipe tally record when the drill pipe segment exits the region of interest in the field of view of the plurality of cameras in a direction away from the wellbore.

22. The drill pipe tally system of claim 21, wherein the computer vision processor is further configured to send a command to the drill pipe elevator to alter an operation of the drill pipe elevator based on the visual data received from the plurality of cameras.

23. The drill pipe tally system of claim 21, wherein the plurality of cameras is configured to simultaneously view a top and a bottom of the drill pipe segment when the drill pipe segment is positioned above a drill string.

24. The drill pipe tally system of claim 21, wherein the computer vision processor is further configured to estimate a length of the drill pipe segment and a diameter of the drill pipe segment, and the pipe tally report includes information about at least one of the length of the drill pipe segment, a diameter of the drill pipe segment, a time the drill pipe segment is added to a drill string, or a time the drill pipe segment is removed from the drill string.

25. The drill pipe tally system of claim 21, wherein the computer vision processor is configured to receive a second pipe tally report and issue an alarm if the pipe tally report does not match the second pipe tally report.

* * * * *